United States Patent
Ukai et al.

(10) Patent No.: US 11,956,606 B2
(45) Date of Patent: Apr. 9, 2024

(54) AUDIO SIGNAL PROCESSING METHOD AND AUDIO SIGNAL PROCESSING APPARATUS THAT PROCESS AN AUDIO SIGNAL BASED ON POSTURE INFORMATION

(71) Applicant: YAMAHA CORPORATION, Hamamatsu (JP)

(72) Inventors: Satoshi Ukai, Hamamatsu (JP); Ryo Tanaka, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 17/492,914

(22) Filed: Oct. 4, 2021

(65) Prior Publication Data

US 2022/0116703 A1 Apr. 14, 2022

(30) Foreign Application Priority Data

Oct. 9, 2020 (JP) .................................. 2020-171052

(51) Int. Cl.
*H04R 3/04* (2006.01)
*G06V 40/16* (2022.01)
*G10L 21/0324* (2013.01)

(52) U.S. Cl.
CPC ............ *H04R 3/04* (2013.01); *G06V 40/161* (2022.01); *G10L 21/0324* (2013.01); *H04R 2430/01* (2013.01)

(58) Field of Classification Search
None
See application file for complete search history.

(56) References Cited

U.S. PATENT DOCUMENTS

| 5,940,118 A | 8/1999 | Van Schyndel et al. |
| 8,185,387 B1 * | 5/2012 | Lachapelle ............. G10L 21/02 |
| | | 379/88.19 |
| 10,959,027 B2 | 3/2021 | Wexler et al. |
| 2001/0055399 A1 * | 12/2001 | Ullrich ................. H04R 25/554 |
| | | 381/104 |

(Continued)

FOREIGN PATENT DOCUMENTS

| EP | 2766901 B1 | 9/2016 |
| EP | 3147898 A1 | 3/2017 |

(Continued)

OTHER PUBLICATIONS

Extended European search report issued in European Appln. No. 21201420.3 dated Mar. 9, 2022.

(Continued)

*Primary Examiner* — James K Mooney
(74) *Attorney, Agent, or Firm* — ROSSI, KIMMS & McDOWELL LLP

(57) ABSTRACT

An audio signal processing method includes receiving an audio signal corresponding to a voice of a talker, obtaining an image of the talker, estimating posture information of the talker using the image of the talker, generating a correction filter according to the estimated posture information, performing filter processing on the audio signal using the generated correction filter, and outputting the audio signal on which the filter processing has been performed.

16 Claims, 13 Drawing Sheets

(56) References Cited

U.S. PATENT DOCUMENTS

| | | | |
|---|---|---|---|
| 2002/0090094 A1* | 7/2002 | Amir | H04R 3/00 |
| | | | 381/92 |
| 2010/0026780 A1 | 2/2010 | Tico et al. | |
| 2013/0329923 A1* | 12/2013 | Bouse | H04R 25/40 |
| | | | 381/313 |
| 2014/0337016 A1* | 11/2014 | Herbig | G06T 7/73 |
| | | | 704/201 |
| 2015/0016644 A1 | 1/2015 | Strelcyk et al. | |
| 2016/0064000 A1 | 3/2016 | Mizumoto et al. | |
| 2016/0241955 A1 | 8/2016 | Thyssen et al. | |
| 2018/0074782 A1 | 3/2018 | McGibney | |
| 2021/0099796 A1* | 4/2021 | Usami | H04R 3/005 |
| 2022/0116729 A1 | 4/2022 | Ukai et al. | |

FOREIGN PATENT DOCUMENTS

| | | | | |
|---|---|---|---|---|
| JP | 2012029209 A | 2/2012 | | |
| WO | 2020079485 A2 | 4/2020 | | |
| WO | WO-2020116054 A1 * | 6/2020 | | H04R 1/406 |

OTHER PUBLICATIONS

Extended European Search Report issued in European Appln. No. 21201410.4 dated Mar. 28, 2022.

Office Action issued in U.S. Appl. No. 17/492,896 dated Sep. 14, 2022.

Communication Pursuant to Article 94(3) EPC issued in European Appln. No. 21201420.3, dated Jan. 25, 2024.

* cited by examiner

| TALKER | X, Y COORDINATES | DISTANCE |
|--------|------------------|----------|
| A1     | 0.152, 0.155     | 0.25     |

FIG.5

| TALKER | LEFT-RIGHT ANGLE OF FACE |
|---|---|
| A1 | 15 |

FIG.11

AUDIO SIGNAL PROCESSING METHOD AND AUDIO SIGNAL PROCESSING APPARATUS THAT PROCESS AN AUDIO SIGNAL BASED ON POSTURE INFORMATION

CROSS REFERENCE TO RELATED APPLICATIONS

This application claims the benefit of priority to Japanese Patent Application No. 2020-171052 filed on Oct. 9, 2020. The entire content of the application is hereby incorporated herein by reference.

BACKGROUND

Technical Field

An embodiment of the present disclosure relates to an audio signal processing method and an audio signal processing apparatus that process an audio signal obtained by a microphone, based on a position of a sound source.

Background Information

Japanese Unexamined Patent Application Publication No. 2012-029209 discloses an audio processing system that detects position information of a talker from an image captured by a camera and performs processing such that a voice of the talker is enhanced based on detected position information.

The voice of a talker changes according to the posture of the talker. However, the audio processing system of Japanese Unexamined Patent Application Publication No. 2012-029209 does not take the posture of the talker into account.

SUMMARY

In view of the foregoing, an object of an embodiment of the present disclosure is to provide an audio signal processing method and an audio signal processing apparatus that are capable of appropriately obtaining a voice of a talker according to the posture of the talker.

An audio signal processing method includes receiving an audio signal corresponding to a voice of a talker, obtaining an image of the talker, estimating posture information of the talker using the image of the talker, generating a correction filter according to the estimated posture information, performing filter processing on the audio signal using the generated correction filter, and outputting the audio signal on which the filter processing has been performed.

According to an embodiment of the present disclosure, a voice of a talker is able to be appropriately obtained according to the posture of the talker.

BRIEF DESCRIPTION OF THE DRAWINGS

FIG. 5 is a view showing an example of position information of a talker.

FIG. 11 is a view showing an example of the posture information.

DETAILED DESCRIPTION

First Embodiment

Figure 1:
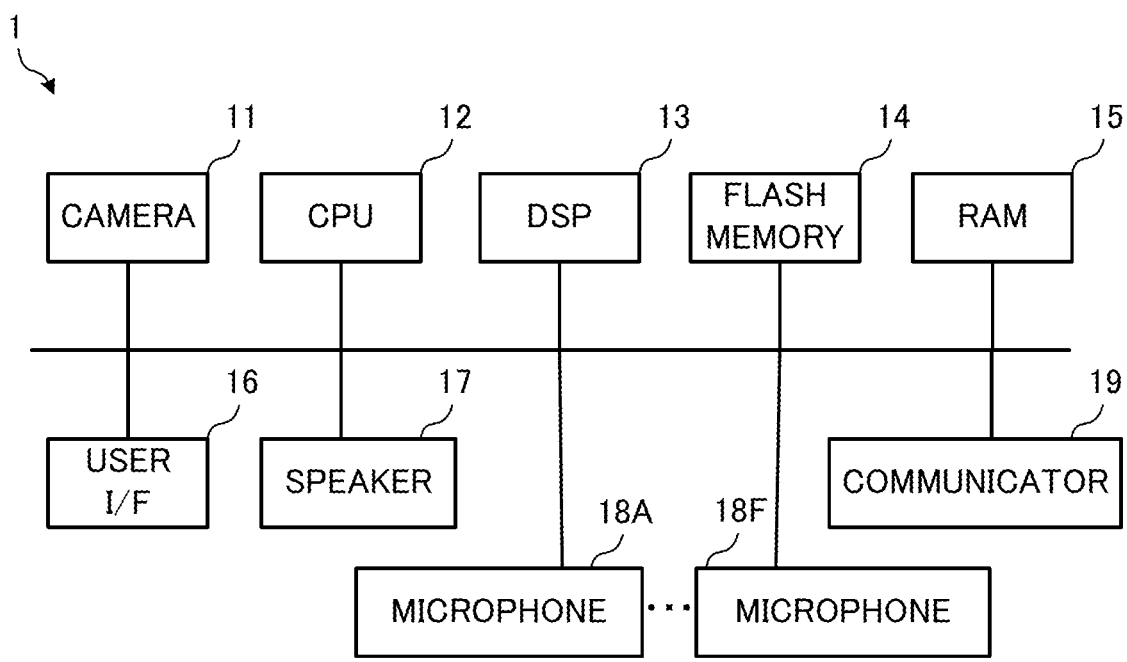
FIG. 1 is a block diagram showing a configuration of an audio signal processing apparatus.
Figure 2:
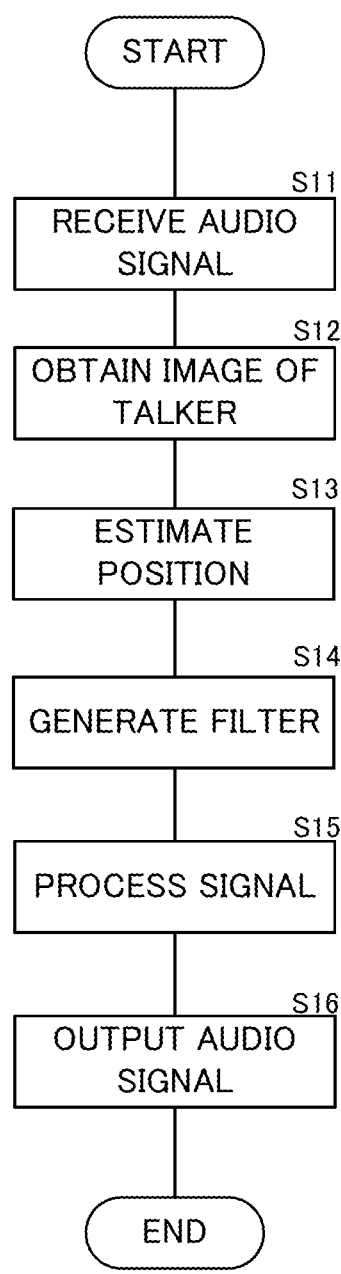
FIG. 2 is a flow chart showing an operation of the audio signal processing method.

FIG. 1 is a block diagram showing a configuration of an audio signal processing apparatus 1. FIG. 2 is a flow chart showing an operation of an audio signal processing method.

The audio signal processing apparatus 1 includes a camera 11, a CPU 12, a DSP 13, a flash memory 14, a RAM 15, a user interface (I/F) 16, a speaker 17, six microphones 18A to 18F, and a communicator 19. It is to be noted that, in the present embodiment, a signal means a digital signal.

The camera 11, the speaker 17, and the microphones 18A to 18F are disposed above or below a display (not shown), for example. The camera 11 obtains an image of a user present in front of the display (not shown). The microphones 18A to 18F obtain a voice of the user present in front of the display (not shown). The speaker 17 outputs a sound to the user present in front of the display (not shown). It is to be noted that the number of microphones is not limited to six. The number of microphones may be one. The number of microphones according to the present embodiment is six, which configures an array microphone. The DSP 13 performs beamforming processing on an audio signal obtained by the microphones 18A to 18F.

The CPU 12 reads an operating program from the flash memory 14 to the RAM 15 and functions as a controller that collectively controls the operations of the audio signal processing apparatus 1. It is to be noted that the program does not need to be stored in the flash memory 14 of the own device. The CPU 12 may download the program each time from a server, for example, and may read out the program to the RAM 15.

The DSP 13 is a signal processor that processes each of a video signal and an audio signal according to the control of the CPU 12. The DSP 13 functions as an image processor that performs framing processing in which an image of a talker is extracted from a video signal, for example. In addition, the DSP 13 also functions as a filter processor that performs correction filter processing of compensating for attenuation of a voice of a talker, for example.

The communicator 19 sends the video signal and the audio signal that have been processed by the DSP 13, to a different apparatus. In addition, the communicator 19 receives a video signal and an audio signal from the different apparatus. The communicator 19 outputs the received video signal to a display (not shown). The communicator 19 outputs the received audio signal to the speaker 17. The display displays an image obtained by a camera of the different apparatus. The speaker 17 outputs the voice of a talker obtained by the microphone of the different apparatus. The different device is an audio signal processing apparatus installed in a remote place, for example. As a result, the audio signal processing apparatus 1 functions as a communication system to perform a voice conversation with a person at a remote location.

Figure 3:
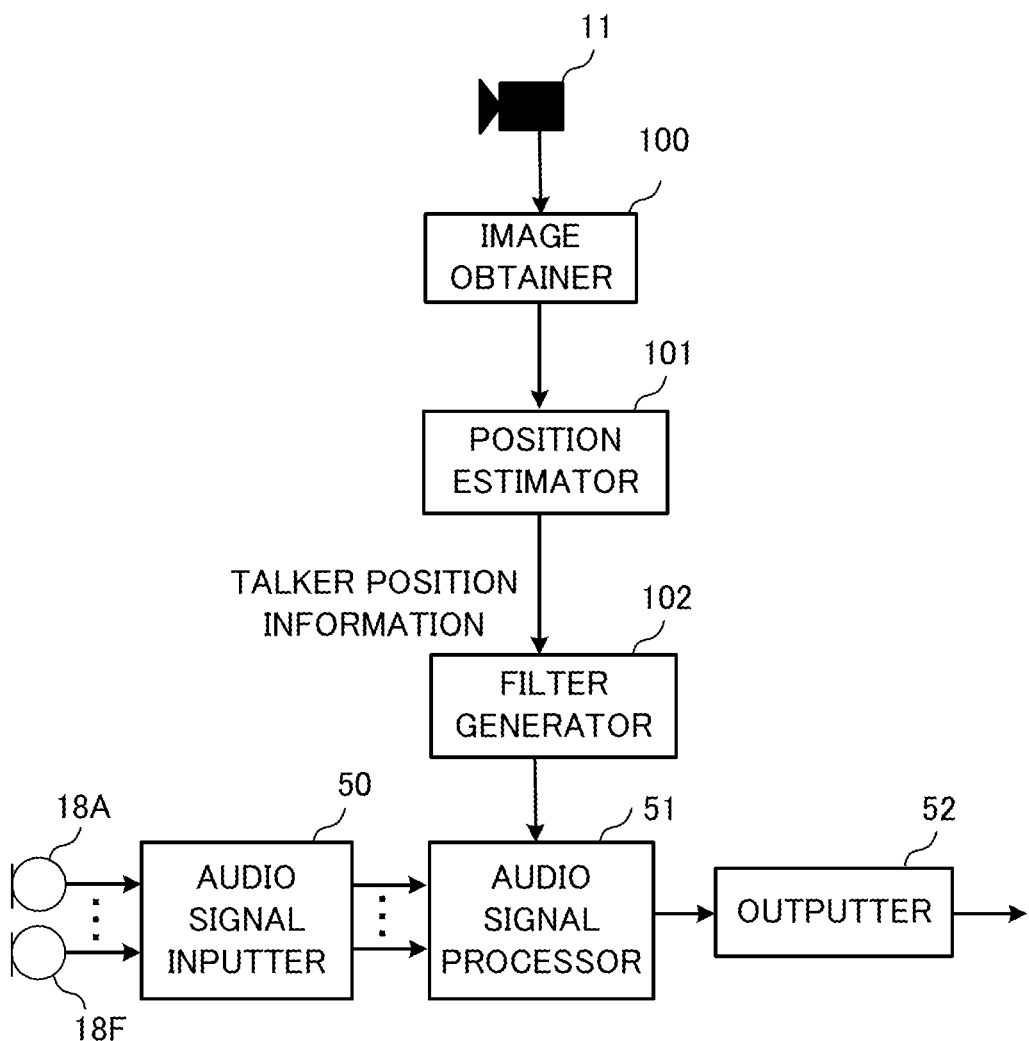
FIG. 3 is a block diagram showing a functional configuration of the audio signal processing apparatus.

FIG. 3 is a functional block diagram of the audio signal processing apparatus 1. Such functional configurations are implemented by the CPU 12 and the DSP 13. As shown in FIG. 3, the audio signal processing apparatus 1 functionally includes an audio signal inputter 50, an audio signal processor 51, an outputter 52, an image obtainer 100, a position estimator 101, and a filter generator 102.

The audio signal inputter 50 receives an input of an audio signal from the microphones 18A to 18F (S11). In addition, the image obtainer 100 obtains an image including an image of a talker from the camera 11 (S12). The position estimator 101 estimates position information of a talker using the obtained image of the talker (S13).

Estimation of the position information includes human face recognition processing. The human face recognition processing is processing of recognizing a face position of a plurality of persons from the images captured by the camera 11, by a predetermined algorithm such as a neural network or the like, for example. Hereinafter, a talker in the present embodiment means a person who participates in a conference and is currently talking, and a user means a person who participates in a conference and includes a talker. A non-user means a person who does not participate in a conference, and a person means any person who is captured by the camera 11.

Figure 4:
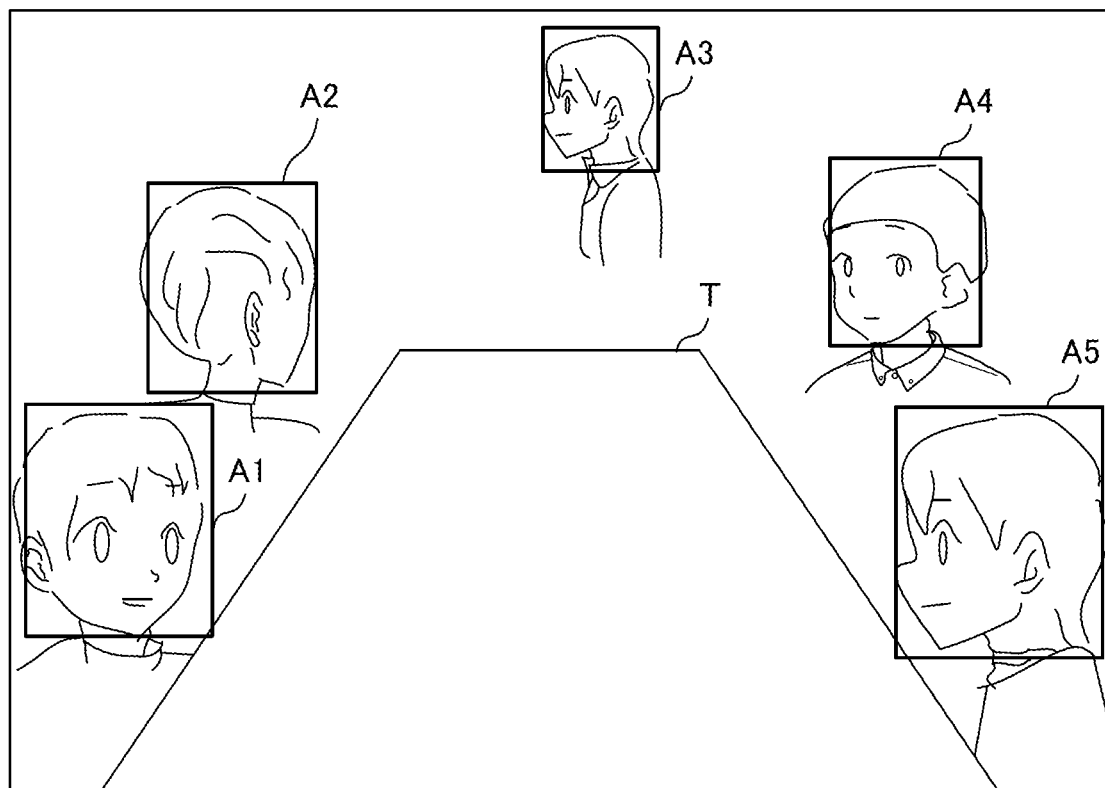
FIG. 4 is a view showing an example of an image captured by a camera 11.

FIG. 4 is a view showing an example of an image captured by the camera 11. In the example of FIG. 4, the camera 11 captures a face image of each of a plurality of persons in the longer direction (the depth direction) of a table T.

The table T has a rectangular shape in a plan view. The camera 11 captures four users on the left side and the right side of the table T in the shorter direction, and a non-user at a position far from the table T.

The position estimator 101 recognizes the face of a person from such image captured by the camera 11. In the example of FIG. 4, a user A1 in the lower left of the image is talking. The position estimator 101 recognizes the face of the user A1 who is currently talking, as the face of a talker, based on the image of a plurality of frames. It is to be noted that other persons A2 to A5, although the faces have been recognized, are not talkers. Therefore, the position estimator 101 recognizes the face of the user A1 as the face of the talker.

The position estimator 101 sets a boundary box (Bounding Box) as shown by the square in FIG. 4, at a position of the face of the recognized talker. The position estimator 101 obtain a distance from a talker, based on the size of the boundary box. The flash memory 14 previously stores a table, a function, or the like that shows the relationship between the size of the boundary box and the distance. The position estimator 101 compares the size of the set boundary box and the table stored in the flash memory 14, and obtains a distance from a talker.

The position estimator 101 obtain two-dimensional coordinates (X, Y coordinates) of the set boundary box and the distance from a talker, as the position information of the talker. FIG. 5 shows an example of the position information of a talker. The position information of a talker includes a label name that indicates the talker, two-dimensional coordinates, and a distance. The two-dimensional coordinates are X, Y coordinates (orthogonal coordinates) with the origin at a predetermined position (the lower left, for example) of the image captured by the camera 11. The distance is a value expressed in meters, for example. The position estimator 101 outputs the position information of a talker, to the filter generator 102. It is to be noted that the position estimator 101, in a case of recognizing faces of a plurality of talkers, outputs the position information of the plurality of talkers.

Moreover, the position estimator 101 may estimate position information of the person, based on not only the image captured by the camera 11 but also the audio signal obtained by the microphones 18A to 18F. In such case, the position estimator 101 receives an input of the audio signal obtained by the microphones 18A to 18F, from the audio signal inputter 50. For example, the position estimator 101 is able to determine a timing at which the voice of the person has reached a microphone by determining the cross correlation of the audio signal obtained by the plurality of microphones. The position estimator 101 is able to determine an arrival direction of the voice of the person, based on a positional relationship of each microphone and the arrival timing of the voice. In such case, the position estimator 101 may only perform face recognition from the image captured by the camera 11. For example, in the example of FIG. 4, the position estimator 101 recognizes the face image of each of the four users on the left side and the right side of the table T in the shorter direction, and the face image of the non-user at a position far from the table T. Then, the position estimator 101, from the face images, determines a face image that matches the arrival direction of the voice of a talker, as the position information of the talker.

In addition, the position estimator 101 may estimate a body of the person from the image captured by the camera 11, and may estimate the position information of the person. The position estimator 101, by a predetermined algorithm using a neural network or the like, determines a framework (a bone) of the person from the image captured by the camera 11. The bone includes an eye, a nose, a neck, a shoulder, a hand, and a leg. The flash memory 14 previously stores a table, a function, or the like that shows the relationship between the size of the bone and the distance. The position estimator 101 compares the size of the recognized bone and the table stored in the flash memory 14, and obtains a distance from the person.

Subsequently, the filter generator 102 generates a correction filter according to the position information of the talker (S14). The correction filter includes a filter to compensate for attenuation of a voice. The correction filter includes gain correction, equalizer, and beamforming, for example. The voice of a talker is attenuated as the distance is increased. In addition, a high band component of the voice of a talker is attenuated more greatly than a low band component of the voice of a talker, as the distance is increased. Therefore, the filter generator 102 generates a gain correction filter such that a level of an audio signal may be increased as a value of the distance among the position information of a talker is increased. In addition, the filter generator 102 may generate an equalizer filter such that the level of the high band may be increased as a value of the distance among the position information of a talker is increased. In addition, the filter generator 102 may generate a correction filter to perform beamforming processing of directing directivity to the coordinates of a talker.

The audio signal processor 51 performs filter processing on the audio signal using the correction filter generated by the filter generator 102 (S15). The outputter 52 outputs the audio signal on which the filter processing has been performed, to the communicator 19 (S16). The audio signal processor 51 includes a digital filter, for example. The audio signal processor 51 performs various types of filter processing by converting an audio signal into a signal on a frequency axis and changing the level of the signal at each frequency.

Figure 6:
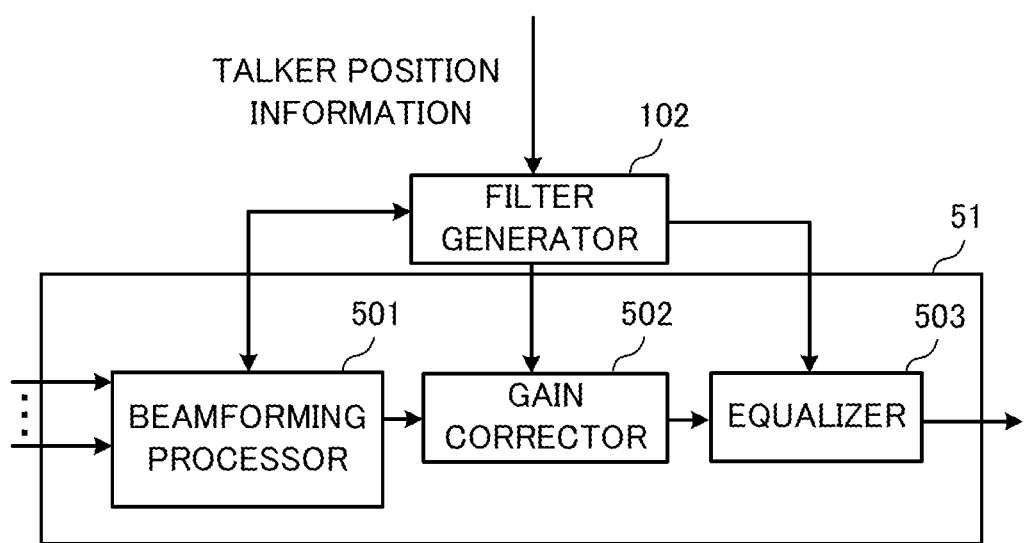
FIG. 6 is a block diagram showing a functional configuration of an audio signal processor 51.

FIG. 6 is a block diagram showing a functional configuration of the audio signal processor 51. The audio signal processor 51 includes a beamforming processor 501, a gain corrector 502, and an equalizer 503. The beamforming processor 501 performs beamforming by performing the filter processing on each of the audio signals obtained by the microphones 18A to 18F and combining the audio signals. The signal processing according to the beamforming can be any processing such as the Delay Sum type, the Griffiths Jim type, the Sidelobe Canceller type, or the Frost Adaptive Beamformer.

The gain corrector 502 corrects a gain of the audio signal on which the beamforming processing has processed. The equalizer 503 adjusts frequency characteristics of the audio signal of which the gain has been corrected. All of the filter of the beamforming processing, the filter of the gain corrector 502, and the filter of the equalizer 503 correspond to the correction filter. The filter generator 102 generates the correction filter according to the position information of the talker.

The filter generator 102 generates a filter coefficient such that directivity toward a position of a talker may be provided, and sets the filter coefficient to the beamforming processor 501. As a result, the audio signal processing apparatus 1 is able to obtain the voice of the talker with high accuracy.

In addition, the filter generator 102 sets the gain of the gain corrector 502, based on the position information of a talker. As described above, the voice of a talker is attenuated as the distance is increased. Therefore, the filter generator 102 generates a gain correction filter such that the level of an audio signal may be increased as a value of the distance among the position information of a talker is increased, and sets the gain correction filter to the gain corrector 502. As a result, the audio signal processing apparatus 1 is able to obtain the voice of the talker at a stable level regardless of the distance from the talker.

In addition, the filter generator 102 sets frequency characteristics of the equalizer 503, based on the position information of a talker. As described above, the filter generator 102 generates an equalizer filter such that the level of the high band may be increased as a value of the distance among the position information of a talker is increased. As a result, the audio signal processing apparatus 1 is able to obtain the voice of the talker at stable voice quality regardless of the distance from the talker.

In addition, the filter generator 102 may obtain information on the arrival direction of a voice from the beamforming processor 501. As described above, the arrival direction of a voice is able to be obtained, based on the audio signals of a plurality of microphones. The filter generator 102 may compare the position information of a person and the information on the arrival direction of a voice, and may set the gain of the gain corrector 502. For example, the filter generator 102 sets a value of the gain to be reduced as a difference (a separation angle) between the position of a talker that is indicated in the position information of the talker and the arrival direction of a voice is increased. In short, the filter generator 102 sets a gain to be inversely proportional to the separation angle. Alternatively, the filter generator 102 may perform setting such that the gain is exponentially reduced according to the separation angle. Alternatively, the filter generator 102 may perform setting such that the gain becomes zero in a case in which the separation angle is equal to or larger than a predetermined threshold. As a result, the audio signal processing apparatus 1 is able to obtain the voice of the talker with higher accuracy.

Figure 7:
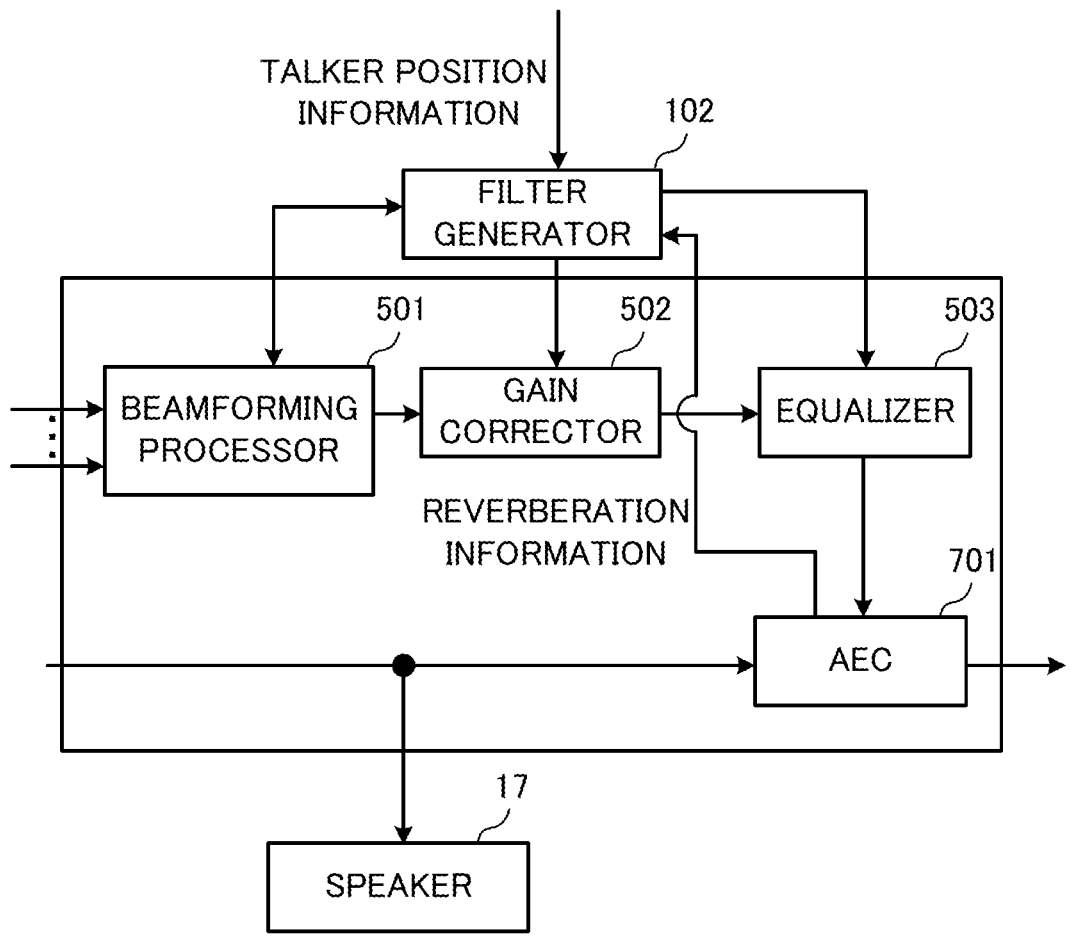
FIG. 7 is a block diagram showing a functional configuration of the audio signal processor 51 in a case of obtaining reverberation characteristics.

In addition, the filter generator 102 may obtain indoor reverberation characteristics, and may generate a correction filter according to the obtained reverberation characteristics. FIG. 7 is a block diagram showing a functional configuration of the audio signal processor 51 in a case of obtaining the reverberation characteristics. The audio signal processor 51 shown in FIG. 7 further includes an adaptive echo canceller (AEC) 701.

The AEC 701 estimates a component (an echo component) of the sound outputted from the speaker 17, where the component is a portion of the sound that returning to the microphones 18A to 18F, and cancels the estimated echo component. The echo component is generated by adaptive filter processing performed on the signal to be outputted to the speaker 17. The adaptive filter includes an FIR filter that stimulates the indoor reverberation characteristics by a predetermined adaptive algorithm. The adaptive filter generates an echo component by performing the filter processing on the signal to be outputted to the speaker 17 by the FIR filter.

The filter generator 102 obtains the reverberation characteristics (reverberation information) simulated by the adaptive filter of the AEC 701. The filter generator 102 generates a correction filter according to the obtained reverberation information. For example, the filter generator 102 obtains power of the reverberation characteristics. The filter generator 102 sets the gain of the gain corrector 502 according to the power of the reverberation characteristics. As described above, the filter generator 102 may perform setting such that the gain is exponentially reduced according to the separation angle. In addition, the filter generator 102 may set an attenuation index to be attenuated more slowly as the power of the reverberation characteristics is increased. In such cases, the filter generator 102 sets a larger threshold value as the power of the reverberation characteristics is increased. When the threshold value is increased, the directivity of a beam generated by the beamforming processor 501 is weaken. In other words, the filter generator 102 weakens the directivity in a case in which a reverberation component is large. In the case in which the reverberation component is large, a voice also arrives from a direction other than the direction of an actual talker, so that the estimation accuracy of the arrival direction is reduced. In other words, a person may be present in a direction other than the estimated arrival direction, and the value of the separation angle may be increased. Therefore, the filter generator 102, in the case in which the reverberation component is large, weakens the directivity and prevents the voice of the talker from being unable to be obtained.

It is to be noted that the filter generator 102, in addition to the position information of a person, may further reflect a result of the framing processing in the correction filter. The user A1 performs an operation to extract a particular area out of the image captured by the camera 11, using the user I/F 16. The DSP 13 performs framing processing of extracting the specified area. The filter generator 102 sets the gain of the gain corrector 502 according to a boundary angle of the extracted area and the arrival direction of a voice. The filter generator 102 sets the gain to zero in a case in which the arrival direction of the voice exceeds the boundary angle of the extracted area and comes out from the extracted area. Alternatively, the filter generator 102, in the case in which the arrival direction of the voice exceeds the boundary angle of the extracted area and comes out from the extracted area, may set a gain that approaches zero as the arrival direction of the voice more greatly exceeds the boundary angle of the extracted area. In addition, the boundary angle may be provided in both the left and right or may be provided in the four directions of left, right, up, and down. As a result, the audio signal processing apparatus 1 is able to obtain the voice of a talker in the area specified by the user, with high accuracy.

Figure 8:
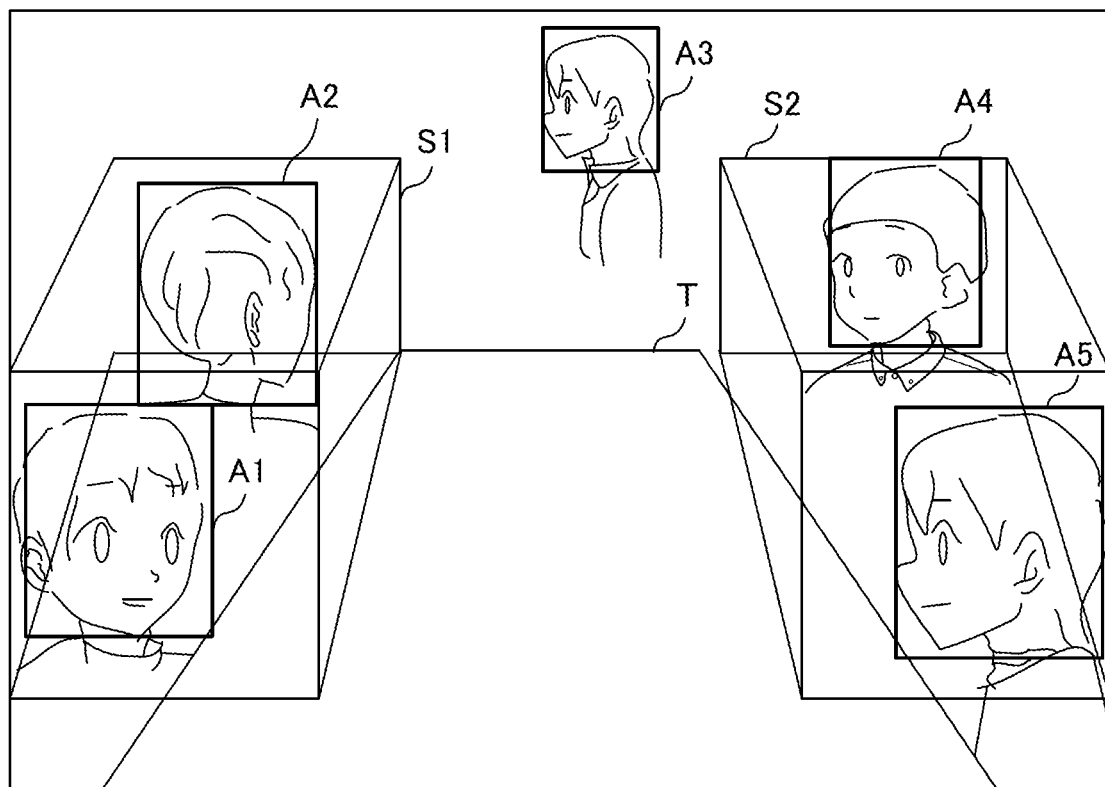
FIG. 8 is a view showing an example in which a correction filter is generated according to a recognition result of a table T.

In addition, the filter generator 102 may generate a correction filter according to a recognition result of a specific object. For example, the position estimator 101 may recognize the table T as a specific object. FIG. 8 is a view showing an example in which a correction filter is generated according to the recognition result of the table T. The position estimator 101 recognizes the table T as a specific object by a predetermined algorithm such as a neural network. The position estimator 101 outputs the position information of the table T to the filter generator 102.

The filter generator 102 generates a correction filter according to the position information of the table T. For example, as shown in FIG. 8, the filter generator 102 generates a filter coefficient such that directivity toward an area S1 and an area S2 that are above the position of the table T and on the left and right sides of the table T in the shorter direction may be provided, and sets the filter coefficient to the beamforming processor 501. Alternatively, the filter generator 102 may set the gain of the gain corrector 502 according to a difference (a separation angle) between the positions of the area S1 and the area S2 and the arrival direction of a voice. The filter generator 102 sets a value of the gain to be reduced as the separation angle is increased. Alternatively, the filter generator 102 may perform setting such that the gain is exponentially reduced according to the separation angle. Alternatively, the filter generator 102 may perform setting such that the gain becomes zero in a case in which the separation angle is a predetermined threshold or more. Alternatively, the filter generator 102 may determine whether the position of a person is inside or outside the area S1 and the area S2, and set the gain of the gain corrector 502 so that the gain becomes zero when the position of a person is outside.

As a result, the audio signal processing apparatus 1 is able to obtain a voice in the area S1 and the area S2 that are above the position of the table T and on the left and right sides of the table T in the shorter direction, with high accuracy. For example, in the example of FIG. 8, the audio signal processing apparatus 1 does not obtain the voice of the user A3 but is able to obtain only the voices of the users A1, A2, A4, and A5.

In addition, the filter generator 102, in a case in which a distance between a person and the table is equal to or larger than a predetermined value, may generate a correction filter that cuts the voice of the corresponding person. For example, in the example of FIG. 8, when the user A3 talks, the position estimator 101 estimates the position of the user A3 as the position information of a talker. However, the filter generator 102, in a case in which the distance from the person is equal to or larger than a predetermined value, generates a correction filter that cuts the voice of the user A3.

It is to be noted that the predetermined value may be obtained based on the recognition result of a specific object. For example, in the example of FIG. 8, the filter generator 102 generates a correction filter that cuts a voice at a position far from the table T.

Second Embodiment

Figure 9:
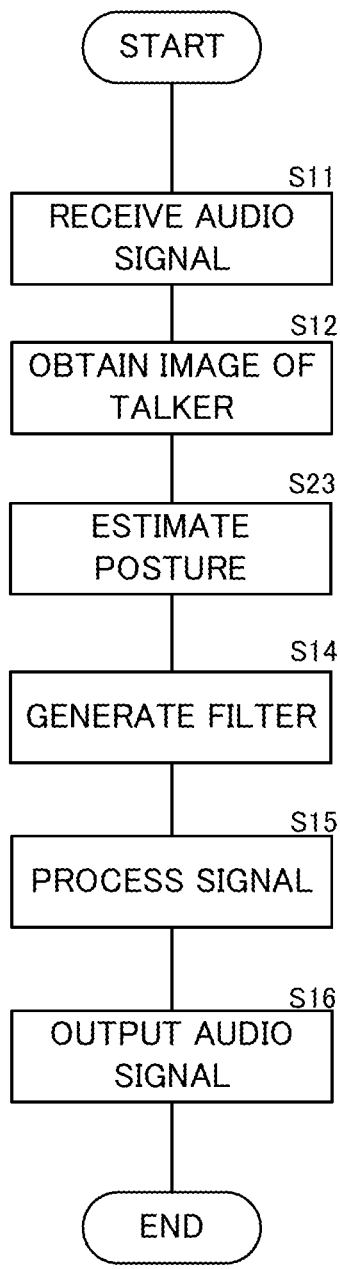
FIG. 9 is a flow chart showing an operation of an audio signal processing method in a case in which a correction filter is generated based on posture information.
Figure 10:
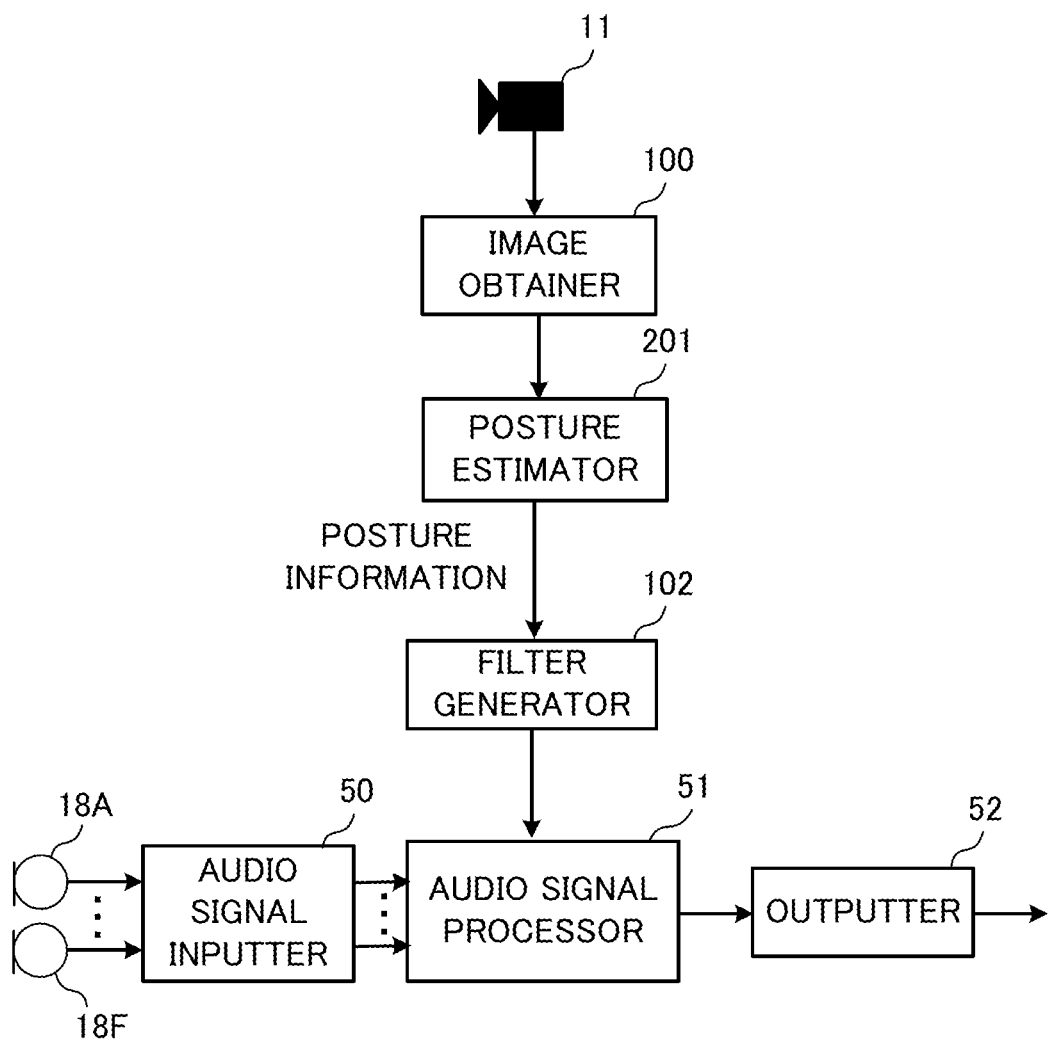
FIG. 10 is a block diagram showing a functional configuration of the audio signal processing apparatus.

Next, FIG. 9 is a flow chart showing an operation of an audio signal processing method in a case in which a correction filter is generated based on posture information. FIG. 10 is a block diagram showing a functional configuration of the audio signal processing apparatus 1 in the case in which a correction filter is generated based on posture information. The audio signal processing apparatus 1 in this example includes a posture estimator 201 in place of the position estimator 101. A hardware configuration is the same as the configuration shown in FIG. 1.

In the example of FIG. 9, in place of the position estimation processing (S13) of the position estimator 101, the posture estimator 201 estimates posture information of a talker from the obtained image of the talker (S23). Other processing is the same as the processing in the flow chart shown in FIG. 2.

Estimation of the posture information includes face recognition processing of a talker. The face recognition processing of a talker is similar to the estimation of the position information, and is processing of recognizing a face position of a talker from an image captured by the camera 11, by a predetermined algorithm such as a neural network or the like, for example. The posture estimator 201 recognizes the face of a talker from the image captured by the camera 11. In addition, the posture estimator 201 estimates a direction that the talker faces, based on the position of eyes, the position of a mouth, the position of a nose, or the other positions, in the recognized face. For example, the flash memory 14 stores a table, a function, or the like in which shifts (offsets) in the position of the eyes, the position of the mouth, and the position of the noise with reference to the face are associated with the posture information. The posture estimator 201 compares the offsets in the position of the eyes, the position of the mouth, and the position of the noise with reference to the face with the table stored in the flash memory 14, and obtains the posture of the talker. It is to be noted that the posture estimator 201, in a case of recognizing the position of the face but being unable to recognize the eyes, the mouth, and the nose, determines that the posture is a backward-looking posture.

Figure 11:
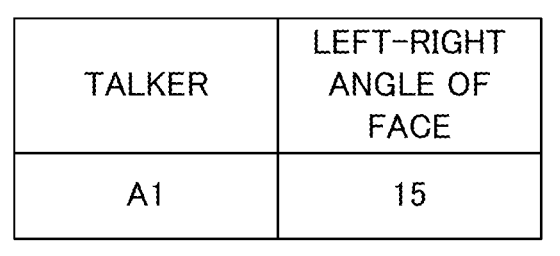

FIG. 11 is a view showing an example of the posture information. The posture of a talker is information that indicates whether a face of the talker is facing in a right direction or a left direction. In other words, a left and right direction (an angle) of the face is indicated in the information. For example, the posture estimator 201 recognizes that the posture of the user A1 is at 15 degrees. In this example, the posture estimator 201 recognizes that the angle is 0 degrees when a talker faces the front, a positive angle when a talker faces the right, a negative angle when a talker faces the left, and 180 degrees (or negative 180 degrees) when a talker faces directly behind.

It is to be noted that the posture estimator 201 may estimate a body of a talker from the image captured by the camera 11, and may estimate the posture information. The posture estimator 201, by a predetermined algorithm such as a neural network or the like, recognizes the bone of a nose and the bones of a body (including a head, a shoulder, a hand, and a leg) from the image captured by the camera 11. The flash memory 14 previously stores a table, a function, or the like in which the shifts (offsets) of the bone of a nose and the bones of a body with the posture information. The posture estimator 201 may compare the offsets of the bone of a nose to the bones of a body with the table stored in the flash memory 14, and may obtain the posture of the talker.

The filter generator 102 generates a correction filter according to the posture information. The correction filter includes a filter to compensate for the level of attenuation according to the direction of a face. The correction filter includes gain correction, equalizer, and beamforming, for example.

Figure 12:
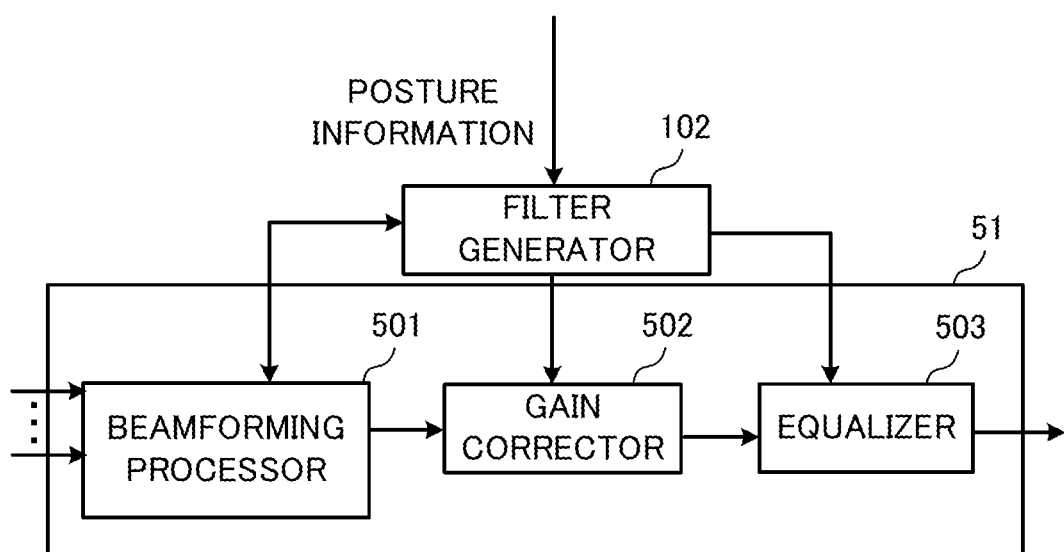
FIG. 12 is a block diagram showing a functional configuration of the audio signal processor 51.

FIG. 12 is a block diagram showing a functional configuration of the audio signal processor 51. The block diagram shown in FIG. 12 shows the same configuration as the block diagram shown in FIG. 6 except that the filter generator 102 receives an input of posture information.

The voice of a talker shows the highest level when the talker faces right in front, and is attenuated as the left and right direction is increased. In addition, the high band is more attenuated than the low band as the left and right direction is increased. Therefore, the filter generator 102 generates a gain correction filter such that the level of an audio signal may be increased as the left and right direction (the angle) is increased (i.e. face of the talker faces farther in the right direction or farther in the left direction), and sets the gain correction filter to the gain corrector 502. In addition, the filter generator 102 may generate an equalizer filter such that the level of the audio signal in the high band may be increased or the level of the audio signal in the low band may be reduced, as the left and right direction (the angle) is increased (i.e. face of the talker faces farther in the right direction or farther in the left direction), and may set the filter to the equalizer 503.

As a result, the audio signal processing apparatus 1 is able to obtain the voice of the talker at a stable level and stable voice quality regardless of the posture from the talker.

In addition, the filter generator 102 may control the directivity of the beamforming processor 501 based on the posture information. The reverberation component shows the lowest level when a talker faces right in front, and is increased as the left and right direction is increased. Therefore, the filter generator 102, in a case in which the left and right direction (the angle) is large, may determine that the reverberation component is large, and may reduce the directivity. As a result, the audio signal processing apparatus 1 is able to obtain the voice of the talker with high accuracy.

Figure 13:
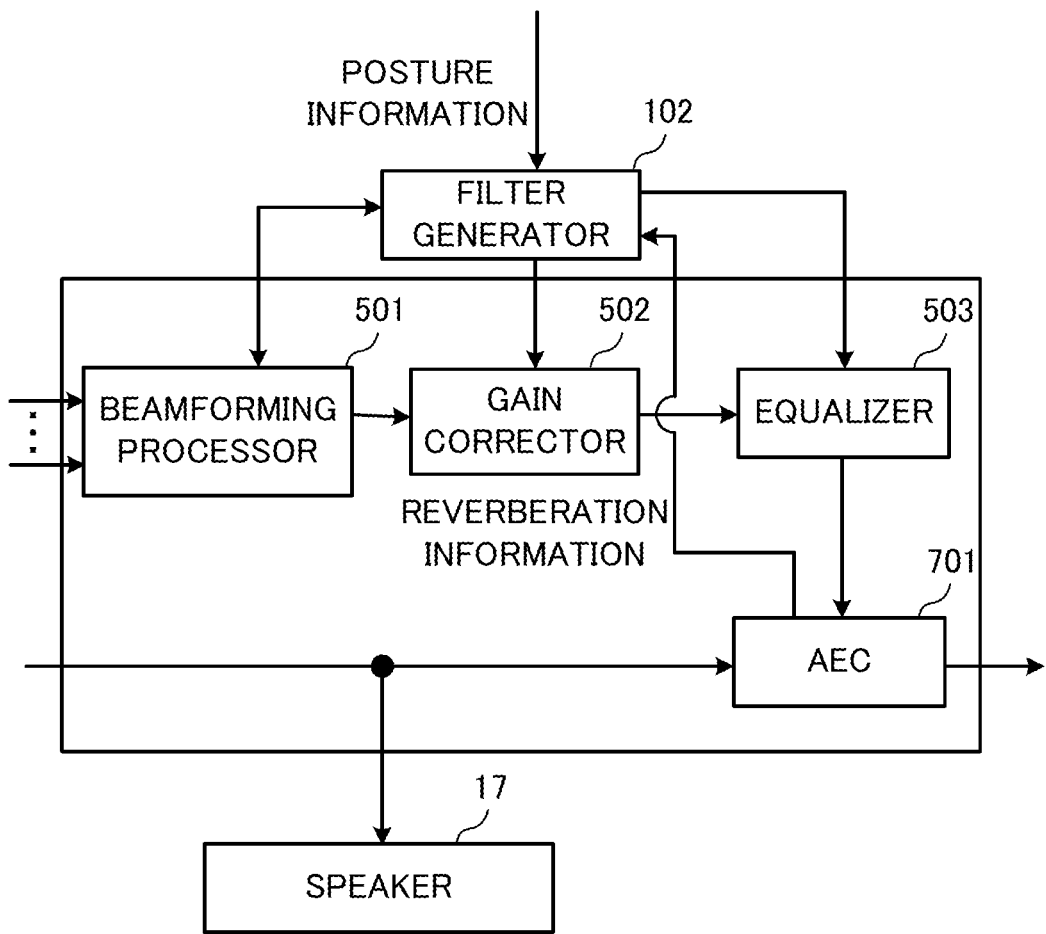
FIG. 13 is a block diagram showing a functional configuration of the audio signal processor 51 in a case of obtaining reverberation characteristics.

In addition, as shown in FIG. 13, the filter generator 102 may obtain reverberation information. FIG. 13 is a block diagram showing a functional configuration of the audio signal processor 51 in a case of obtaining reverberation characteristics. The configuration of FIG. 13 is the same as the configuration in the example of FIG. 7. The filter generator 102 obtains the reverberation information from the AEC 701. The filter generator 102 generates a correction filter according to the obtained reverberation information. For example, the filter generator 102 obtains power of the reverberation characteristics. The filter generator 102 may set the gain of the gain corrector 502 according to the power of the reverberation characteristics.

The audio signal processing apparatus 1 according to the first embodiment provides an example in which a correction filter is generated based on position information, and the audio signal processing apparatus 1 according to the second embodiment generates a correction filter based on posture information. As a matter of course, the audio signal processing apparatus 1 may generate a correction filter based on both of the position information and the posture information. However, an estimated speed in the position information may be different from an estimated speed in the posture information. The estimated speed of the position information in the audio signal processing apparatus 1 according to the first embodiment is faster than the estimated speed of the posture information according to the second embodiment. In such case, the filter generator 102 may generate a correction filter at each of the times when the position estimator 101 estimates position information and when the posture estimator 201 estimates posture information.

The descriptions of the first embodiment and the second embodiment are illustrative in all respects and should not be construed to be restrictive. The scope of the present disclosure is defined not by the foregoing embodiments but by the following claims for patent. Further, the scope of the present disclosure includes the scopes of the claims for patent and the scopes of equivalents.

What is claimed is:

1. An audio signal processing method comprising:
receiving an audio signal corresponding to a voice of a talker;
obtaining an image of the talker;
estimating posture information of the talker using the image of the talker;
generating a correction filter according to the estimated posture information;
performing filter processing on the audio signal using the generated correction filter; and
outputting the audio signal on which the filter processing has been performed,
wherein:
the estimated posture information includes a direction in which a face of the talker faces,
the generated correction filter is configured to perform beamforming on the audio signal, and, in the filter processing performed on the audio signal using the generated correction filter, a directional strength of the beamforming is controlled according to the direction in which the face of the talker faces, and
the directional strength of the beamforming is sharpest when the face of the talker is facing right in front.

2. The audio signal processing method according to claim 1, wherein:
the generated correction filter is configured to compensate for an attenuation of the voice of the talker according to the direction in which the face of the talker faces.

3. The audio signal processing method according to claim 1, wherein the correction filter is configured to adjust a level of the audio signal.

4. The audio signal processing method according to claim 1, wherein:
the estimated posture information includes information that indicates whether a face of the talker is facing in a right direction or a left direction; and
the correction filter is generated according to whether the face of the talker is facing in the right direction or the left direction.

5. The audio signal processing method according to claim 4, wherein the correction filter is configured to increase a level of the audio signal in a high band or to reduce a level of the audio signal in a low band, as the face of the talker faces farther in the right direction or farther in the left direction.

6. The audio signal processing method according to claim 1, wherein:
the estimated posture information includes information that indicates whether the face of the talker is facing in a right direction, a left direction, or a front direction, the correction filter is generated according to whether the face of the talker is facing in the right direction, the left direction, or the front direction, and the front direction is a direction in which a first level of the audio signal corresponding to the voice of the talker is received at a level higher than a second level of the audio signal corresponding to the voice of the talker in a case where the face of the talker is facing in the right direction and higher than a third level of the audio signal corresponding to the voice of the talker in a case where the face of the talker is facing in the left direction.

7. The audio signal processing method according to claim 1, wherein the estimated posture information includes information on a backward-looking posture.

8. The audio signal processing method according to claim 1, further comprising estimating position information of the talker using the image of the talker, wherein:

the correction filter is generated according to the estimated posture information and the estimated position information;

a speed at which the position information is estimated exceeds a speed at which the posture information is estimated; and the correction filter is generated at each of times when the position information is estimated and when the posture information is estimated.

9. An audio signal processing apparatus comprising:

an audio signal inputter configured to receive an audio signal corresponding to a voice of a talker;

an image obtainer configured to obtain an image of the talker;

a posture estimator configured to estimate posture information of the talker using the image of the talker;

a filter generator configured to generate, according to the estimated posture information, a correction filter;

an audio signal processor configured to perform filter processing on the audio signal using the generated correction filter; and an outputter configured to output the audio signal on which the filter processing has been performed, wherein:

the estimated posture information includes a direction in which a face of the talker faces, the generated correction filter is configured to perform beamforming on the audio signal, and, in the filter processing performed by the audio signal processor on the audio signal using the generated correction filter, a directional strength of the beamforming is controlled according to the direction in which the face of the talker faces, and the directional strength of the beamforming is sharpest when the face of the talker is facing right in front.

10. The audio signal processing apparatus according to claim 9, wherein:

the generated correction filter is configured to compensate for an attenuation of the voice of the talker according to the direction in which the face of the talker faces.

11. The audio signal processing apparatus according to claim 9, wherein the correction filter is configured to adjust a level of the audio signal.

12. The audio signal processing apparatus according to claim 9, wherein:

the estimated posture information includes information that indicates whether a face of the talker is facing in a right direction or a left direction; and the filter generator is configured to generate the correction filter according to whether the face of the talker is facing in the right direction or the left direction.

13. The audio signal processing apparatus according to claim 12, wherein the correction filter is configured to increase a level of the audio signal in a high band or to reduce a level of the audio signal in a low band, as the face of the talker faces farther in the right direction or farther in the left direction.

14. The audio signal processing apparatus according to claim 9, wherein:

the estimated posture information includes information that indicates whether the face of the talker is facing in a right direction, a left direction, or a front direction, the filter generator is configured to generate the correction filter according to whether the face of the talker is facing in the right direction, the left direction, or the front direction, and the front direction is a direction in which a first level of the audio signal corresponding to the voice of the talker is received at a level higher than a second level of the audio signal corresponding to the voice of the talker in a case where the face of the talker is facing in the right direction and higher than a third level of the audio signal corresponding to the voice of the talker in a case where the face of the talker is facing in the left direction.

15. The audio signal processing apparatus according to claim 9, wherein the estimated posture information includes information on a backward-looking posture.

16. The audio signal processing apparatus according to claim 9, further comprising a position estimator configured to estimate position information of the talker using the image of the talker, wherein:

the filter generator is further configured to generate the correction filter according to the estimated posture information and the estimated position information;

a speed at which the position information is estimated exceeds a speed at which the posture information is estimated; and the correction filter is generated at each of times when the position information is estimated and when the posture information is estimated.

* * * * *